US005940085A

United States Patent [19]

Chandavarker et al.

[11] Patent Number: 5,940,085

[45] Date of Patent: Aug. 17, 1999

[54] REGISTER CONTROLLED TEXT IMAGE STRETCHING

[75] Inventors: Dinesh D. Chandavarker, Cupertino; Mel Walter Eatherington, San Jose; Bipin H. Biscuitwala, Sunnyvale, all of Calif.

[73] Assignee: Chips & Technologies, Inc., San Jose, Calif.

[21] Appl. No.: 08/772,794

[22] Filed: Dec. 24, 1996

[51] Int. Cl.[6] ........ G06F 15/00

[52] U.S. Cl. ........ 345/471; 345/472; 345/467; 345/141

[58] Field of Search ........ 345/128–129, 345/130–132, 141–143, 471, 472, 467, 468, 469; 382/298, 299

[56] References Cited

U.S. PATENT DOCUMENTS

| | | | |
|---|---|---|---|
| 4,107,786 | 8/1978 | Masaki et al. | 345/130 |
| 4,283,724 | 8/1981 | Edwards | 345/128 |
| 5,016,000 | 5/1991 | Bugg | 345/141 |
| 5,122,789 | 6/1992 | Ito | 345/130 |
| 5,521,614 | 5/1996 | Kotha et al. | 345/128 |
| 5,739,870 | 4/1998 | Simpson | 348/628 |

*Primary Examiner*—Richard A. Hjerpe
*Assistant Examiner*—Francis N. Nguyen
*Attorney, Agent, or Firm*—D'Alessandro & Ritchie

[57] ABSTRACT

A text image stretching system in a VGA for a plurality of text image font sizes comprises a plurality of cell line replication registers having inputs and outputs, the plurality of cell line replication registers formed into groups corresponding to one of the plurality of text image font sizes, each cell line replication register having a plurality of bits, the inputs of the plurality of cell line replication registers connected to the VGA to receive cell line replication information for storage in the plurality of cell line replication registers, a multiplexer having data inputs, first and second select inputs and a plurality of outputs, each of the data inputs connected to one of the plurality of bits of the plurality of cell line replication registers, the first and second select inputs decoded to select one bit from each of the cell line replication registers in one of the groups of the cell line replication registers to form a cell line replication code for output on the plurality of outputs, a repeat counter having a plurality of inputs and an output, the plurality of inputs connected to the plurality of outputs of the multiplexer to input the cell line replication code to form a repeat value, a character cell height register having an input, and first and second outputs, the input connected to the VGA to receive character cell height data, the second output connected to the second select input of the multiplexer and a cell line counter having first and second inputs and an output, the first input connected to the first output of the character cell line height register, the second input coupled to the output of the output of the repeat counter, and the output connected to the first select input of the multiplexer.

5 Claims, 2 Drawing Sheets

REGISTER CONTROLLED TEXT IMAGE STRETCHING

BACKGROUND OF THE INVENTION

1. Field of the Invention

The present invention relates to the text image mode of a video graphics adapter (VGA). More particularly, the present invention relates to programmable text image stretching by replication of the cell lines in a character cell wherein the character cell height is not managed by the computer system's basic input and output system (BIOS).

2. The Prior Art

In a character oriented or text video display, the microprocessor of the computer system views the video display screen as an array of character positions. Each of the character positions in the array is termed a character cell. The display of an individual text character in a character cell is formed as a dot matrix in the character cell. The number of dots or pixels in the character cell height corresponds to the font size of the text. Typically, the number of dots in the height of the character cell is eight, fourteen, or sixteen dots. The IBM text mode standard character cell sizes are, 9×14 dot, 8×16 dots, and a double scan of 8×8 dots (width×height). The size of the character cell includes dots to provide blank space between individual characters in the same row and between lines of text in adjacent rows.

An individual row of dots in a character cell is referred to as a cell line. For example, in a character cell that is sixteen dots in height, there will be sixteen cell lines in the character cell. In a row of text images displayed on a video display screen, the corresponding cell lines of each of the character cells in the row are strung together to form a scan line. The number of rows in the array of character cells that are present in the video display screen may vary, but typically there are twenty-five rows in the array. For a video display screen with a character cell size that is sixteen dots in height, and which has twenty-five rows in the array of character cells, there will be four hundred scan lines, in the video display screen. The most widespread video display screens have either three hundred and fifty or four hundred scan lines.

In IBM standard text mode, each of the text characters in each of the three standard font sizes generally have a unique dot matrix pattern. For example, the text character "A" will have a dot matrix pattern that is different from the dot matrix pattern of the text character "B", and the dot matrix pattern for the text character "A" in a character cell having a height of fourteen dots will be different from the text character "A" in a character cell having a height of sixteen dots. Upon power up, the operating system will load the dot matrix pattern of each character in each font into a font memory space that is readily accessible to the microprocessor, typically a character generator RAM in the VGA. The dot matrix pattern of every cell line of each character in a font is assigned a different addressable location in the character generator RAM.

The lines of text images appearing on a video display screen are output from the character generator RAM as a plurality of scan lines under the control of a video display controller in the VGA.

For the character generator RAM to output data to the video display screen, the character generator RAM is provided with two pieces of address information by the video display controller. The first piece of address information identifies the character to be displayed and any desired attributes of the character such as blinking, bold, etc. The first piece of address information is obtained from a RAM by the video display controller in the VGA in response to a signal from the microprocessor. The video display controller in the VGA concatenates the first piece of address information with the second piece of address information. The second piece of information is the cell line of the character that is to be displayed. This second piece of address information is generated by the video display controller. With these two pieces of information, the dot pattern comprising a scan line may be read out of the character generator RAM and displayed on the video display screen.

The text images displayed in text mode are commonly generated by an application program designed to display specific information to the user of a computer system. For example, when an IBM compatible computer using DOS in turned on, text images are displayed to the computer user. The designers of these application programs sometimes desire to display the text images on the video display screen in a height that is greater than any of the three standard text font sizes available. Changing the font size height of one of the three font sizes is known in the art as text image stretching. There are generally two implementations of text image stretching known in the prior art. Both implementations scan one or more cell lines in a character cell more than once.

In the first implementation of prior art text image stretching, the IBM standard, both the cell lines in the character cell selected for replication and number of times the selected cell lines are to be replicated is fixed or hardwired into the machine. For example, to stretch the text image from a character cell height of sixteen dots to a text image of twenty-four dots in height, the machine may be hardwired so that three of the cell lines might be scanned three times and two of the cell lines might be scanned two times to provide a total of eight additional cell lines in the text image.

In a second implementation of prior art text image stretching, the cell lines in the character cell selected for replication and number of times the selected cell lines are to be replicated are programmed by the designer of the application program displaying the text images. The codes for selecting the cell lines in the character cell for replication and number of times the selected cell lines are to be replicated reside in a pair of registers in the video display controller. The control instructions in the pair of registers are loaded by the microprocessor BIOS when an application program is opened or the font size in the application program is changed. When the font size in the application program is changed, the application program in this prior art implementation requests the BIOS to change a character cell height register in the video display controller to reflect the change in the font size. The character cell height register is employed by the VGA to keep track of the cell line being replicated.

This second prior an text image stretching implementation represents an improvement over the IBM standard hardwired text image stretching, because the control codes loaded onto the pair of registers can be programmed to select the desired text image stretching. In this implementation, a bit corresponding to the cell line being scanned is selected from each of the pair of registers to form a count of zero, one, two, or three indicating the number of times the cell line should be scanned. When the count is zero, the video display controller increments the portion of the address provided to the character generator RAM that indicates the cell line to be scanned. A drawback to this approach is that the microprocessor BIOS is required to manage the font size to correspond to the control codes in the pair of registers for the new font size.

Accordingly, it is an object of the present invention to provide text image stretching that is programmable for the desired cell line replication by an application program, but does not require the microprocessor BIOS to manage a change in font size.

BRIEF DESCRIPTION OF THE INVENTION

According to the present invention, three pairs of registers are disposed in a video display controller of a VGA. The three pairs of registers contain control bits to control the cell line replication employed to provide text image stretching. Each of the three register pairs contains the control codes for one of the three standard IBM font sizes in text mode. One bit is selected from each register in the register pair to provide a two bit code to direct the number of times a selected cell line in one of the three fort sizes will be replicated. A cell height or font size register is loaded by an application program employing the text mode to select the pair of registers corresponding to the selected fort size.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

It is well known in the art that the three IBM standard font sizes employed to display text images on a video display screen by an application program may be customized to be vertically stretched to a size greater than the "normal" font size. In the present invention, the instructions to stretch any of the three standard font sizes may be employed by the application program without requiring the application program to access the BIOS to select the font size.

Figure 1:
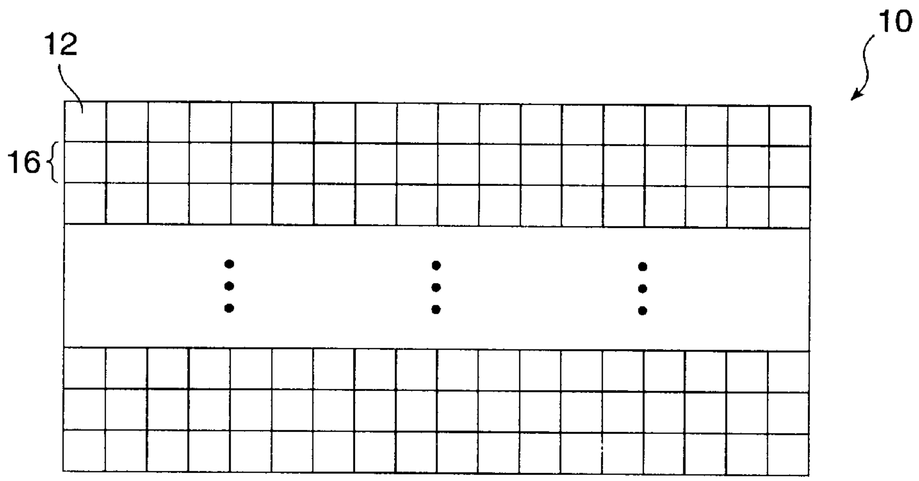
FIG. 1 is a video display screen illustrating an array of character cells suitable for use in the present invention.

FIG. 1 illustrates video display screen 10. In a computer system with a character oriented or text mode video display, the microprocessor of the computer system views the video display screen as an array of character positions known as character cells. Although only a single character cell in the video display is identified by the reference numeral 12, it should be appreciated that each of the character cells in the array is identical to character cell 12. According to the preferred embodiment of the present invention, the IBM standard text mode, well known to those of ordinary skill in the art, is employed.

Figure 2:
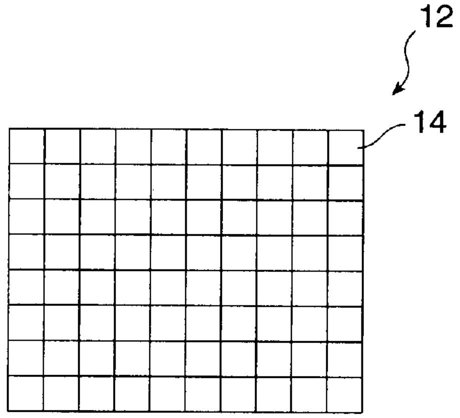
FIG. 2 illustrates the dot matrix of a single one of the character cells suitable for use in the present invention from the array of character cells depicted in FIG. 1.

As depicted in FIG. 2, the display of an individual text character in character cell 12 is formed as a dot matrix. The number of dots or pixels in character cell 12 is selected by the application program employing the text mode. Typically, the number of dots in the height of the character cell is from eight to sixteen dots. In the IBM standard, character cell 12 heights of eight, fourteen, and sixteen dots can be selected. Each row of dots in character cell 12 is referred to as a cell line 14. Accordingly, for a character cell 12 that is sixteen dots in height, there will be sixteen cell lines 14 in the character cell 12.

Figure 3:
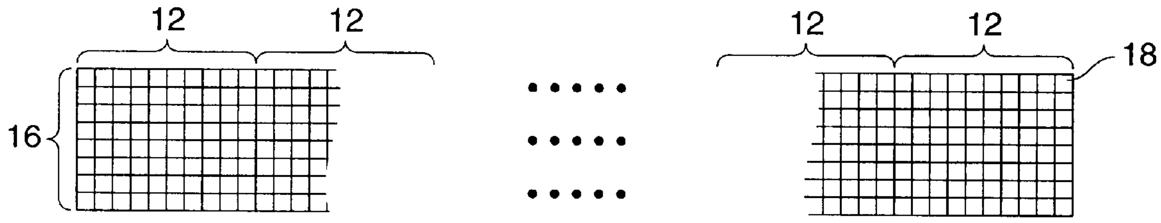
FIG. 3 illustrates in dot matrix form a row of character cells suitable for use in the present invention from the array of character cells depicted in FIG. 1.

In FIG. 3, a row 16 of character cells 12 from the video display screen 10 are shown in dot matrix form. The row 16 of character cells 12 normally displays a single line of text. The number of rows 16 that are present in the video display screen 10 may vary, but typically there are twenty-five rows in the array. For a video display screen with a character cell size that is sixteen dots in height, and which has twenty-five rows in the array of character cells, there will be four hundred rows of dots, known as scan lines 18, in the video display screen. The most widespread video display screens have either three hundred and fifty or four hundred scan lines 18. To generate the video image of the text on the video display screen 10, the dot patterns being scanned onto the video display screen are output from a VGA to the video display screen 10 one scan line 18 at a time in a sequential manner. The scan rates required to generate an acceptable video image are well known in the art, and will therefore not be discussed herein to avoid obscuring the present invention.

Figure 4:
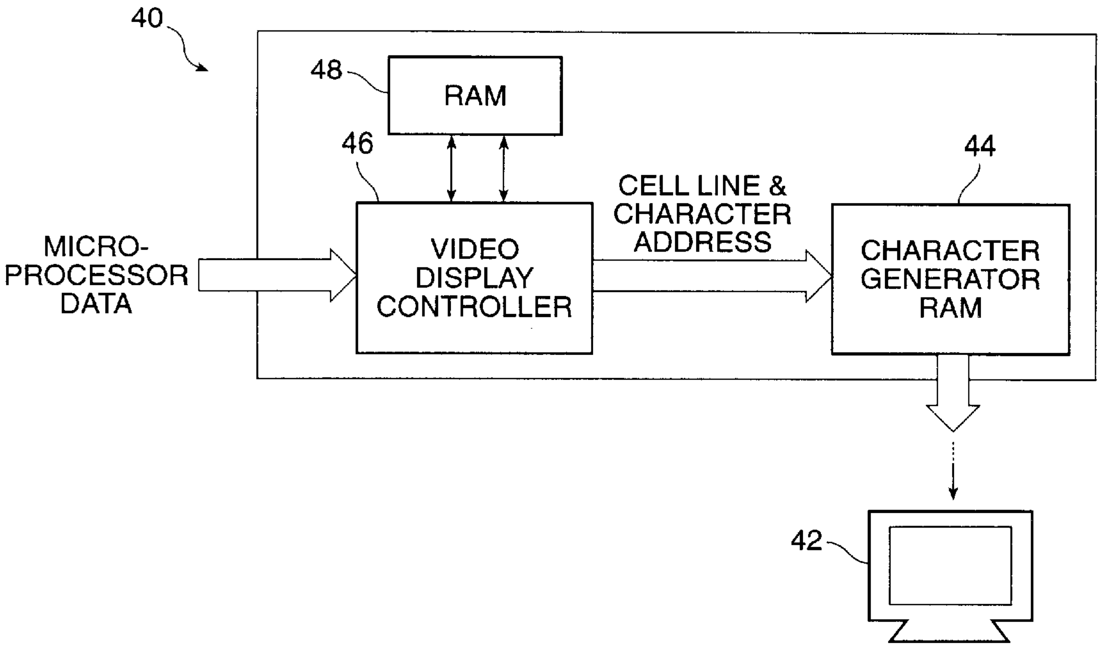
FIG. 4 is a simplified block diagram of a VGA for the generation of text images on a video display according to the present invention.

Turning now to FIG. 4, a simplified block diagram of a VGA 40 is illustrated. In VGA 40, the text that is scanned and appears on the video display screen 42 is output from a character generator RAM 44. The character generator RAM 44 contains all of the dot matrix patterns for the text mode characters. The dot pattern for each cell line in a character resides in an addressable location in the character generator RAM 44. The dot pattern information loaded into character generator RAM 44 for each of the text mode characters in the different font sizes is well known in the art and will not be disclosed further herein. The character generator 44 obtains the dot pattern information from font memory space, usually a RAM (nor shown), that is loaded by the operating system on power up of the computer system.

When an application program is opened or a font size change in an already opened application program is made, the contents of the memory locations from the font memory space for the selected font in the application program are loaded into the character generator RAM 44. Control of the output of the character generator RAM 44 is exercised by a video display controller 46 in the VGA 40. The video display controller 46 controls the two pieces of address information the character generator RAM 44 requires to output data to the video display screen 42.

The first piece of address information identifies the character to be displayed. The microprocessor signals the video display controller 46 to obtain this piece of information from RAM 48. The address information from RAM 48 typical includes two bytes of address information. The first byte is the character to be displayed and the second byte is attribute information such as blink, color, bold, etc.

The second piece of information is the number of the cell line in the character that is to be displayed. The video display controller 46 uses the character information and the cell line information to form the address provided to the character generator RAM 44 in a manner well known in the art. With the address information, the dot pattern comprising a scan line may be read out of the character generator RAM 44 and displayed on the video display screen 42. To replicate a cell line and thereby provide text image stretching, the address provided by the video display controller 46 to the character generator RAM 44 is not changed.

In the IBM standard text mode there are three different sizes of text font available. It should be appreciated that many of the same text characters formed in different sized fonts have a unique dot matrix pattern for a particular font size. For example, the text character "A" in a font size fourteen dots in height, will have a dot matrix pattern that is different from the dot matrix pattern of the text character "A" in a font size sixteen dots in height.

Figure 5:
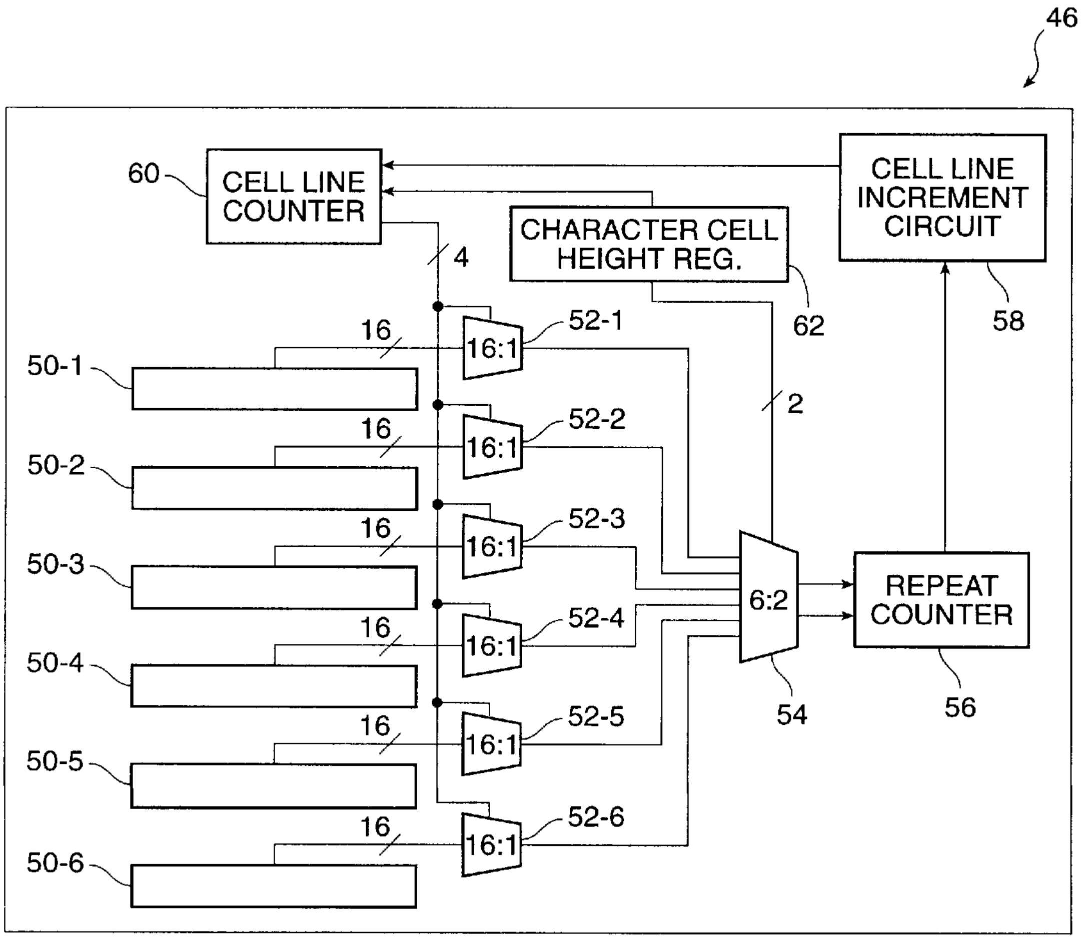
FIG. 5 is a more detailed schematic diagram of a video display controller from the block diagram of the VGA depicted in FIG. 4 according to the present invention.

Turning now to FIG. 5, a schematic diagram of the video display controller 46 according to the present invention is illustrated. On video display controller 46 there are depicted three pairs of sixteen bit cell line replication registers 50-1 and 50-2, 50-3 and 50-4, and 50-5 and 50-6, respectively. The output of each of the six cell line replication registers 50-1 through 50-6 is connected to a 16 to 1 multiplexer.

As illustrated, the output of cell line replication register 50-1 is connected to the input of 16 to 1 multiplexer 52-1, the output of cell line replication register 50-2 is connected to the input of 16 to 1 multiplexer 52-2, the output of cell line replication register 50-3 is connected to the input of 16 to 1 multiplexer 52-3, the output of cell line replication register 50-4 is connected to the input of 16 to 1 multiplexer 52-4, the output of cell line replication register 50-5 is connected to the input of 16 to 1 multiplexer 52-5, and the output of cell line replication register 50-6 is connected to the input of 16 to 1 multiplexer 52-6.

The outputs of the 16 to 1 multiplexers 52-1 through 52-6 are connected to the inputs of a 6 to 2 multiplexer 54. The first and second outputs of the 6 to 2 multiplexer 54 are connected to a repeat counter 56. The output of repeat counter 56 is connected to the enable input of a cell line increment circuit 58. A cell line counter 60 has first and second inputs connected to the cell line increment circuit 58 and to a character cell height register 62, respectively. The four bit output of cell line counter 60 is connected to the select inputs of the 16 to 1 multiplexers 52-1 through 52-6, and the two-bit output of the character cell height register 62 is connected to the select inputs of the 6 to 2 multiplexer 54.

As described above, when performing a stretch of a text image by the replication of a cell line, it is desirable to customize the selection of the cell lines to be replicated for each font size and for the amount of stretching that is to be performed. By doing so, the apparent distortion which occurs in the text image stretch of some font sizes when the cell lines selected for replication are the same in each font size can be eliminated.

It is known that there are three standard character cell heights of eight, fourteen and sixteen dots. When the computer system is turned on, the computer system BIOS determines whether the character cell height is eight, fourteen or sixteen dots high. The BIOS then loads this value into the character cell height register 62 found in the video display controller 46. The video display controller 46 uses this value to set the count in the cell line counter 60 and also uses this value for the select inputs to the 6 to 2 multiplexer 54 to select a pair of bits from one of the three pairs of cell line replication registers 50-1 and 50-2, 50-3 and 50-4, and 50-5 and 50-6, respectively.

The values in the three cell line replication register pairs 50-1 and 50-2, 50-3 and 50-4, and 50-5 and 50-6, respectively, correspond to the cell line replication codes for character cell heights of eight, fourteen and sixteen dots, respectively. Those of ordinary skill in the art will readily recognize that more than three register pairs may be implemented to correspond to other cell heights. Further, it will also be appreciated that the cell line replication registers may be formed into groups larger than two. To determine the number of times a cell line should be replicated, one bit is taken from each cell line replication register in one of the three cell line replication register pairs 50-1 and 50-2, 50-3 and 50-4, and 50-5 and 50-6, respectively, to form a cell line replication code which indicates the number of times a cell line will be replicated. With the two-bit code from one of the cell line replication register pairs 50-1 and 50-2, 50-3 and 50-4, and 50-5 and 50-6, respectively, there are four possibilities for the number of times a cell line may be replicated. In the presently preferred embodiment, a cell line may be replicated from 0 to 3 times.

The bit selection from each of the cell line replication registers 50-1 through 50-6 is performed by 16 to 1 multiplexers 52-1 through 52-6. The bit number selected corresponds to the value in the cell line counter 60. The selection of a pair of bits from one of the three cell line replication register pairs 50-1 and 50-2, 50-3 and 50-4, and 50-5 and 50-6, respectively, is performed by 6 to 2 multiplexer 54. When the character cell height is eight dots, the pair of bits is selected from cell line replication register pair 50-1 and 50-2. When the character cell height is fourteen dots, the pair of bits is selected from cell line replication register pair 50-3 and 50-4. When the character cell height is sixteen dots, the pair of bits is selected from cell line replication register pair 50-5 and 50-6. It will be appreciated by those of ordinary skill in the art that 16 to 1 multiplexers 52-1 through 52-6 and multiplexer 54 may be combined to form a single multiplexer. Fulher, it will be appreciated that other schemes for selecting the cell line replication codes from the cell line replication registers fall within the scope of the present invention.

The pair of selected bits is stored as a value 0 through 3 in repeat counter 56. When this value reaches zero, the repeat counter 56 signals the cell line increment circuit 58 to increment the value in the cell line counter 60, and the pair of bits corresponding to the next cell line for replication is chosen. It is the value in the cell line counter 60 that the video display controller employs to form, along with the character information provided by RAM 48, the address provided to the character generator RAM 44.

In the present invention, when the application program using the text mode requires a change in font size, the application program directs the change in font size by loading the value corresponding to the desired font size in character cell height register 62. Accordingly, the application program is not required to request the BIOS to provide a new set of replication instructions to the video display controller 46, because the replication instructions for the new font size may be found in the pair of cell line replication registers 50-1 and 50-2, 50-3 and 50-4, and 50-5 and 50-6 corresponding to the selected font size loaded into the character cell height register 62.

While embodiments and applications of this invention have been shown and described, at would be apparent to those skilled in the art that many more modifications than mentioned above are possible without departing from the inventive concepts herein. The invention, therefore, is not to be restricted except in the spirit of the appended claims.

What is claimed is:

1. A text image stretching system in a VGA for a plurality of text image font sizes comprising:

a plurality of cell line replication registers having inputs and outputs, said plurality of cell line replication registers formed into groups corresponding to one of the plurality of text image font sizes, each cell line replication register having a plurality of bits, said inputs of said plurality of cell line replication registers connected to the VGA to receive cell line replication information for storage in said plurality of cell line replication registers;

a multiplexer having data inputs, first and second select inputs and a plurality of outputs, each of said data inputs connected to one of said plurality of bits of said plurality of cell line replication registers, said first and second select inputs decoded to select one bit from each of said cell line replication registers in one of said groups of said cell line replication registers to form a cell line replication code for output on said plurality of outputs;

a repeat counter having a plurality of inputs and an output, said plurality of inputs connected to said plurality of outputs of said multiplexer to input said cell line replication code to form a repeat value;

a character cell height register having an input, and first and second outputs, said input connected to the VGA to receive character cell height data, said second output connected to said second select input of said multiplexer; and a cell line counter having first and second inputs and an output; said first input connected to said first output of said character cell line height register, said second input coupled to said output of said repeat counter, and said output connected to said first select input of said multiplexer.

2. The text image stretching system of claim 1 wherein there are three groups of cell line replication registers.

3. A text image stretching system in a VGA for a plurality of text image font sizes comprising:

three groups of two cell line replication registers have inputs and outputs, said cell line replication registers formed into three pairs corresponding to one of the plurality of text image font sizes, each cell line replication register having a plurality of bits, said inputs of said plurality of cell line replication registers connected to the VGA to receive cell line replication information for storage in said plurality of cell line replication registers;

a multiplexer having data inputs, first and second select inputs and a plurality of outputs, each of said data inputs connected to one of said plurality of bits of said plurality of cell line replication registers, said first and second select inputs decoded to select one bit from each of said cell line replication registers in one of said pairs of said cell line replication registers to form a cell line replication code for output on said plurality of outputs;

a repeat counter having a plurality of inputs and an output said plurality of inputs connected to said plurality of outputs of said multiplexer to input said cell line replication code to form a repeat value;

a character cell height register having an input, and first and second outputs, said input connected to the VGA to receive character cell height data, said second output connected to said second select input of said multiplexer; and a cell line counter having first and second inputs and an output; said first input connected to said first output of said character cell line height register, said second input coupled to said output of said repeat counter, and said output connected to said first select input of said multiplexer.

4. The text image stretching system of claim 1 wherein each of said plurality of cell line replication registers has sixteen bits.

5. A text image stretching system in a VGA for a plurality of text image font sizes comprising:

a plurality of cell line replication registers having inputs and outputs, said plurality of cell line replication registers formed into pairs of cell line replication registers corresponding to one of a plurality of text image font sizes, each cell line replication register having sixteen bits, said inputs of said plurality of cell line replication registers connected to the VGA to receive cell line replication information for storage in said plurality of cell line replication registers;

a multiplexer having data inputs, first and second select inputs and a plurality of outputs, each of said data inputs connected to one of said plurality of bits of said plurality of cell line replication registers, said first and second select inputs decoded to select one bit from each of said cell line replication registers in one of said groups of said cell line replication registers to form a cell line replication code for output on said plurality of outputs;

a repeat counter having a plurality of inputs and an output, said plurality of inputs connected to said plurality of outputs of said multiplexer to input said cell line replication code to form a repeat value;

a character cell height register having an input, and first and second outputs, said input connected to the VGA to receive character cell height data, said second output connected to said second select input of said multiplexer; and a cell line counter having first and second inputs and an output; said first input connected to said first output of said character cell line height register, said second input coupled to said output of said repeat counter, and said output connected to said first select input of said multiplexer.

* * * * *

UNITED STATES PATENT AND TRADEMARK OFFICE

CERTIFICATE OF CORRECTION

PATENT NO. : 5,940,085
DATED : August 17, 1999
INVENTOR(S) : Dinesh D. Chandavarker, Mel Walter Eatherington, and Bipin H. Biscuitwala It is certified that error appears in the above-identified patent and that said Letters Patent is hereby corrected as shown below:

Column 1,
Line 23, please replace "sizes are." with -- sizes are: --.

Column 2,
Line 56, please replace "prior an" with -- prior art --.
Line 59, please replace "loaded onto" with -- loaded into --.

Column 3,
Line 20, please replace "three fort" with -- three font --.
Line 23, please replace "selected fort" with -- selected font --.

Column 4,
Line 42, please replace "nor shown" with -- not shown --.

Column 5,
Line 16, please replace "On video" with -- In video --.

Column 6,
Line 34, please replace "Fulher, it will" with -- Further, it will --.

Column 7,
Line 38, please replace "registers have" with -- registers having --.

Column 8,
Line 24, please replace "one of a plurality" with -- one of the plurality --.

Signed and Sealed this

Eleventh Day of September, 2001

*Attest:*

Nicholas P. Godici

NICHOLAS P. GODICI

*Attesting Officer* *Acting Director of the United States Patent and Trademark Office*

UNITED STATES PATENT AND TRADEMARK OFFICE

CERTIFICATE OF CORRECTION

PATENT NO. : 5,940,085 
DATED : August 17, 1999
INVENTOR(S) : Dinesh D. Chandavarker, et al.

It is certified that error appears in the above-identified patent and that said Letters Patent is hereby corrected as shown below:

<u>Column 1,</u>
Line 23, "sizes are:" was mistakenly written "sizes are."

<u>Column 2,</u>
Line 56, "prior art" was mistakenly written "prior an"
Line 59, "loaded into" was mistakenly written "loaded onto"

<u>Column 3,</u>
Line 20, "three font" was mistakenly written "three fort"
Line 23, "selected font" was mistakenly written "selected fort"

<u>Column 4,</u>
Line 42, "not shown" was mistakenly written "nor shown"

<u>Column 5,</u>
Line 16, "In video" was mistakenly written "On video"

<u>Column 6,</u>
Line 34, Further, it will" was mistakenly written "Fulher, it will"

<u>Column 7,</u>
Line 38, "registers having" was mistakenly written "registers have"

<u>Column8,</u>
Line 24, "one of the plurality" was mistakenly written "one of a plurality"

Signed and Sealed this

Sixth Day of November, 2001

*Attest:*

Nicholas P. Godici

NICHOLAS P. GODICI

*Attesting Officer* *Acting Director of the United States Patent and Trademark Office*